US011848977B2

(12) United States Patent
Valz

(10) Patent No.: US 11,848,977 B2
(45) Date of Patent: *Dec. 19, 2023

(54) PROVIDING CONTENT TO CO-LOCATED DEVICES WITH ENHANCED PRESENTATION CHARACTERISTICS

(71) Applicant: Google LLC, Mountain View, CA (US)

(72) Inventor: Duane Valz, Mountain View, CA (US)

(73) Assignee: GOOGLE LLC, Mountain View, CA (US)

(*) Notice: Subject to any disclaimer, the term of this patent is extended or adjusted under 35 U.S.C. 154(b) by 72 days.

This patent is subject to a terminal disclaimer.

(21) Appl. No.: 16/952,857

(22) Filed: Nov. 19, 2020

(65) Prior Publication Data

US 2021/0075845 A1    Mar. 11, 2021

Related U.S. Application Data

(63) Continuation of application No. 14/102,348, filed on Dec. 10, 2013, now Pat. No. 10,873,616.

(51) Int. Cl.
*H04L 12/70*       (2013.01)
*H04L 67/02*       (2022.01)
(Continued)

(52) U.S. Cl.
CPC ............ *H04L 67/02* (2013.01); *H04L 65/612* (2022.05); *H04L 67/303* (2013.01);
(Continued)

(58) Field of Classification Search
CPC ... H04L 67/02; H04L 65/4084; H04L 67/306; H04L 67/32; H04L 67/303; H04L 67/26
(Continued)

(56) References Cited

U.S. PATENT DOCUMENTS 7,085,710 B1    8/2006  Beckert et al.
7,134,131 B1 *  11/2006 Hendricks ........ H04N 21/25891
                                                        348/E7.071
(Continued)

FOREIGN PATENT DOCUMENTS

EP          1 044 119 B1       5/2005
WO          WO-99/35009        7/1999
WO          WO-2006/041754 A2  4/2006

OTHER PUBLICATIONS

Non-Final Office Action for U.S. Appl. No. 13/633,330 dated Mar. 16, 2021 (14 pages).

(Continued)

*Primary Examiner* — Ario Etienne
*Assistant Examiner* — Elizabeth Kassa
(74) *Attorney, Agent, or Firm* — Dority & Manning, P.A.

(57) ABSTRACT

Methods, systems, and apparatus include computer programs encoded on a computer-readable storage medium, including a method for providing content. A user of an initiating device is identified. Profile information for the identified user is located. The initiating device includes a display for presenting content to the user. An indication is received from an application running on the initiating device of an intent by the user to receive a first content item on a separate but co-located presentation device having enhanced presentation characteristics for presenting content. Additional content items are selected for delivery along with the first content item. The selection includes identifying a second different content item based on the profile information for the identified user and the enhanced presentation characteristics. The first and second different content items are delivered directly to the co-located presentation device without delivering the first and second different content items to the initiating device.

20 Claims, 5 Drawing Sheets

(51) Int. Cl.
  *H04L 67/55* (2022.01)
  *H04L 67/60* (2022.01)
  *H04L 67/306* (2022.01)
  *H04L 65/612* (2022.01)
  *H04L 67/303* (2022.01)
(52) U.S. Cl.
  CPC ............ *H04L 67/306* (2013.01); *H04L 67/55* (2022.05); *H04L 67/60* (2022.05)
(58) Field of Classification Search
  USPC ........................................................ 709/217
  See application file for complete search history.

(56) References Cited

U.S. PATENT DOCUMENTS

| | | | |
|---|---|---|---|
| 7,433,974 B2 | 10/2008 | Beckert et al. | |
| 7,725,463 B2 | 5/2010 | Hurst-Hiller et al. | |
| 8,001,290 B2 | 8/2011 | Beckert et al. | |
| 8,028,093 B2* | 9/2011 | Karaoguz | H04N 7/18 725/140 |
| 8,065,026 B2 | 11/2011 | Beckert et al. | |
| 9,154,534 B1 | 10/2015 | Gayles et al. | |
| 9,396,490 B1 | 7/2016 | Marx et al. | |
| 10,424,009 B1* | 9/2019 | Paton | G06Q 30/0643 |
| 2002/0152117 A1 | 10/2002 | Cristofalo et al. | |
| 2004/0049503 A1 | 3/2004 | Modha et al. | |
| 2005/0209719 A1 | 9/2005 | Beckert et al. | |
| 2005/0209852 A1 | 9/2005 | Beckert et al. | |
| 2006/0004891 A1 | 1/2006 | Hurst-Hiller et al. | |
| 2006/0143158 A1* | 6/2006 | Ruhl | G06F 16/951 |
| 2007/0250193 A1* | 10/2007 | Raines | H04N 5/765 386/E5.07 |
| 2008/0216122 A1* | 9/2008 | Pong | H04N 21/47 725/37 |
| 2008/0242280 A1 | 10/2008 | Shapiro et al. | |
| 2008/0288600 A1 | 11/2008 | Clark | |
| 2009/0157491 A1 | 6/2009 | Brougher et al. | |
| 2009/0163186 A1 | 6/2009 | Gupta et al. | |
| 2009/0228615 A1 | 9/2009 | Beckert et al. | |
| 2009/0267867 A1* | 10/2009 | Gonia | H04M 1/72412 345/157 |
| 2010/0023395 A1 | 1/2010 | Bugenhagen | |
| 2010/0324993 A1 | 12/2010 | Kacholia et al. | |
| 2011/0153324 A1 | 6/2011 | Ballinger et al. | |
| 2011/0211114 A1* | 9/2011 | Cooper | H04N 21/64769 348/E7.003 |
| 2011/0312278 A1* | 12/2011 | Matsushita | H04W 4/80 455/66.1 |
| 2012/0047277 A1* | 2/2012 | Keidar | H04N 5/50 348/731 |
| 2012/0054664 A1 | 3/2012 | Dougall et al. | |
| 2012/0060176 A1 | 3/2012 | Chai et al. | |
| 2012/0077586 A1 | 3/2012 | Pishevar | |
| 2012/0272147 A1 | 10/2012 | Strober | |
| 2012/0287022 A1 | 11/2012 | Queen | |
| 2013/0024364 A1 | 1/2013 | Shrivastava et al. | |
| 2013/0097239 A1 | 4/2013 | Brown et al. | |
| 2013/0124759 A1 | 5/2013 | Strober | |
| 2013/0238702 A1* | 9/2013 | Sheth | H04W 8/24 709/204 |
| 2013/0246778 A1 | 9/2013 | Nikara et al. | |
| 2013/0311874 A1 | 11/2013 | Schachar et al. | |
| 2014/0020039 A1* | 1/2014 | Wang | H04L 65/4084 725/110 |
| 2014/0052872 A1 | 2/2014 | Varoglu et al. | |
| 2014/0067549 A1* | 3/2014 | Park | G06Q 30/0241 705/14.68 |
| 2014/0067828 A1 | 3/2014 | Archibong et al. | |
| 2014/0085179 A1* | 3/2014 | Krig | G06F 3/14 345/156 |
| 2014/0101710 A1* | 4/2014 | Kim | H04N 21/4782 725/110 |
| 2014/0108929 A1* | 4/2014 | Garmark | H04N 21/8113 715/716 |
| 2014/0172892 A1 | 6/2014 | Schechter et al. | |
| 2015/0095936 A1* | 4/2015 | Yu | H04N 21/4334 725/98 |
| 2015/0100983 A1* | 4/2015 | Pan | H04N 21/4222 725/39 |
| 2016/0162928 A1 | 6/2016 | Ali | |
| 2017/0092278 A1 | 3/2017 | Evermann et al. | |
| 2017/0110130 A1 | 4/2017 | Sharifi et al. | |
| 2017/0110144 A1 | 4/2017 | Sharifi et al. | |
| 2017/0132019 A1 | 5/2017 | Karashchuk et al. | |
| 2017/0358301 A1 | 12/2017 | Raitio et al. | |

OTHER PUBLICATIONS

Notice of Allowance for U.S. Appl. No. 16/688,709 dated Apr. 16, 2021 (8 pages).
"10 Tips to Improve the Performance of Google Product Listing Ads", Foghorn Labs, retrieved Mar. 18, 2013 from URL: http://www.foghornlabs.com/2012/11/21/product-listing-ads-best-practices/ (5 pages).
"Advertising: Xbox 360", Microsoft, retrieved Dec. 10, 2013 from URL: http://advertising.microsoft.com/en-us/xbox-360-advertising (2 pages).
"Advice for YouTube: Find a Subscription Model to Keep Viewers Clicking." Wharton University of Pennsylvania, Jul. 17, 2013, retrieved Dec. 10, 2013 from URL: http://knowledge.wharton.upenn.edu/article/advice-for-youtube-find-a-subscription-model-to-keep-viewers-cliekcing/ (7 pages).
"Chromecast", Wikipedia, retrieved Oct. 28, 2013 from URL: http://en.wikipedia.org/wiki/Chromecast (6 pages).
"'Dolphin' attacks fool Amazon, Google voice assistants", BBC News, Sep. 7, 2017 (8 pages).
"GoogleAssistant SDK", Google Developers, Google, retrieved Aug. 22, 2017 from URL: https://developers.google.com/assistant/sdk/ (4 pages).
"Products Feed Specification", Google Merchant Center Help, Google, Inc., retrieved Mar. 18, 2013 from URL: http://www.support.google.com/merchants/bin/answer.py?hl=en&answer=188494#US (6 pages).
"Supported File Formats", Google Merchant Center Help, Google, Inc., retrieved Mar. 18, 2013 from URL: http://www.support.google.com/merchants/bin/answer.py?hl=en&answer=160567 (1 page).
"Walmart and Google to offer voice-enabled shopping", BBC News, Aug. 23, 2017 (10 pages).
"What is Apple TV?", Apple, retrieved Dec. 10, 2013 from URL: http://www.apple.com/appletv/what-is/ (5 pages).
"What is Roku?", Roku, retrieved Dec. 10, 2013 from URL: http://www.roku.com/meet-roku (5 pages).
Abrams, Brad, "Help users find, interact & re-engage with your app on the Google Assistant", Google Developers Blog, Nov. 15, 2017 (16 pages).
Advisory Action for U.S. Appl. No. 14/102,348 dated Jun. 22, 2020 (4 pages).
Albrecht, Chris, "Alexa, How Can You Be Used in Restaurants?", The Spoon, Dec. 10, 2017 (6 pages).
Amazon, "Echo Look | Hands-Free Camera and Style Assistant", retrieved Aug. 22, 2017 from URL: https://www.amazon.com/gp/product/B0186JAEWK?ref%5F=cm%5Fsw%5Fr%5Ffa%5Fdp%5Ft2%5FC50azbJTKCB18&pldnSite=1 (7 pages).
Barr, Jeff, "AWS DeepLens—Get Hands-On Experience with Deep Learning With Our New Video Camera", AWS News Blog, Nov. 29, 2017 (11 pages).
Broussard, Mitchel, "Chatbot-Like Siri Patent Includes Intelligent Image, Video, and Audio Recognition within Messages", MacRumors, May 11, 2017 (7 pages).
Buckland et al., "Amazon's Alexa Takes Open-Source Route to Beat Google Into Cars", Bloomberg, Feb. 27, 2018 (6 pages).
Chen, Lulu Yilun, "Alibaba Challenges Google, Amazon With New Echo-Like Device", Bloomberg Technology, Jul. 5, 2017 (3 pages).
Clover, Juli, "Amazon and Google Want to Turn Their Smart Home Speakers Into Telephone Replacements", MacRumors, Feb. 15, 2017 (5 pages).

(56) References Cited

OTHER PUBLICATIONS

Coberly, Cohen, "Apple patent filing reveals potential whispering Siri functionality", Techspot, Dec. 14, 2017 (4 pages).
Collins, et al., "Can Twitter Save Itself?", CNET, Apr. 26, 2017, retrieved Aug. 22, 2017 from URL: https://www.cnet.com/news/twitter-q1-2017-earnings/ (3 pages).
Crist, Ry, "Logitech Harmony's Alexa skill just got a whole lot better", CNET, Jul. 13, 2017 (2 pages).
Estes, Adam Clark, "Amazon's Newest Gadget Is a Tablet That's Also an Echo", Gizmodo, Sep. 19, 2017 (3 pages).
Final Office Action for U.S. Appl. No. 13/633,330 dated Feb. 21, 2020 (12 pages).
Final Office Action for U.S. Appl. No. 13/633,330 dated Feb. 28, 2017 (17 pages).
Final Office Action for U.S. Appl. No. 13/633,330 dated Oct. 5, 2018 (11 pages).
Final Office Action for U.S. Appl. No. 14/102,348 dated Aug. 1, 2018 (26 pages).
Final Office Action for U.S. Appl. No. 14/102,348 dated Jan. 27, 2020 (18 pages).
Final Office Action for U.S. Appl. No. 14/102,348 dated Jul. 11, 2017 (22 pages).
Final Office Action for U.S. Appl. No. 14/102,348 dated Jul. 18, 2016 (19 pages).
Final Office Action for U.S. Appl. No. 15/661,948 dated Sep. 11, 2019 (19 pages).
Final Office Action for U.S. Appl. No. 15/661,993 dated Apr. 14, 2020 (12 pages).
Forrest, Conner, "Essential Home wants to be bridge between Amazon's Alexis, Apple's Siri, and Google Assistant", TechRepublic, May 31, 2017 (10 pages).
Foxx, Chris, "Apple reveals HomePod smart speaker", BBC News, Jun. 5, 2017 (6 pages).
Gebhart, Andrew, "Google Assistant is spreading, but it needs its own Echo Dot", CNET, May 20, 2017, retrieved Aug. 22, 2017 from URL: https://www.cnet.com/news/google-assistant-is-spreading-but-google-still-needs-a-dot/ (7 pages).
Gebhart, Andrew, "Google Home to the Amazon Echo: 'Anything you can do . . . '", CNET, May 18, 2017 (7 pages).
Gibbs, Samuel, "Your Facebook Messenger app is about to be filled with ads", The Guardian, Jul. 12, 2017, retrieved Aug. 22, 2017 from URL: https://www.theguardian.com/technology/2017/jul/12/facebook-messenger-app-adverts (3 pages).
Golgowski, Nina, "This Burger King Ad Is Trying to Control Your Google Home Device", HuffPost, Apr. 12, 2017 (7 pages).
Gurman, et al., "Apple Is Manufacturing a Siri Speaker to Outdo Google and Amazon", Bloomberg, May 31, 2017 (5 pages).
Hardwick, Tim, "Facebook Smart Speaker Coming Next Year With 15-inch Touch Panel", MacRumors, Jul. 25, 2017 (5 pages).
Heater, Brian, "Amazon Alexa devices can finally tell voices apart", TechCrunch, Oct. 11, 2017 (6 pages).
Johnston, Lisa, "Amazon Whirlwind: New Echo, Plus, Spot, Connect, Fire TV Take The Stage", Twice, Sep. 27, 2017 (10 pages).
Kelion, Leo, "Amazon revamps Echo smart speaker family", BBC News, Sep. 27, 2017 (11 pages).
Kelion, Leo, "Amazon's race to make Alexa smarter", BBC News, Jul. 28, 2017 (8 pages).
Koetsier, John, "Ads on Amazon Echo: Wendy's, ESPN, And Progressive Among Brands Testing", Forbes, May 11, 2017 (2 pages).
Krishna, Swapna, "Jim Beam's smart decanter will pour you a shot when you ask", engadget, Nov. 29, 2017 (3 pages).
Lacy, Lisa, "Improving search and advertising are the next frontiers for voice-activated devices", TechCrunch, Dec. 20, 2017 (13 pages).
Larson, Selena, "Google Home now recognizes your individual voice", CNN Money, San Francisco, California, Apr. 20, 2017 (3 pages).
Lee, Dave, Take Two for Samsung's troubled Bixby assistant, BBC News, Oct. 19, 2017 (6 pages).
Lee, Dave, "The five big announcements from Google I/O", Bbc News, May 18, 2017 (9 pages).
Lund, Pamela, "Mastering Google Product Feeds and Product Listing Ads—Part 1", retrieved Dec. 28, 2013 from URL: http://www.blueglass.com/blog/mastering-google-product-feeds-and-product-listing-ads-part-1/#comments (17 pages).
Nieva, Richard, "Google Home and eBay can tell you how much that's worth", CNET, Mar. 8, 2017 (3 pages).
Non-Final Office Action for U.S. Appl. No. 13/633,330 dated Jan. 5, 2016 (12 pages).
Non-Final Office Action for U.S. Appl. No. 13/633,330 dated Jun. 28, 2019 (12 pages).
Non-Final Office Action for U.S. Appl. No. 13/633,330 dated May 17, 2018 (11 pages).
Non-Final Office Action for U.S. Appl. No. 14/102,348 dated Dec. 15, 2016 (22 pages).
Non-Final Office Action for U.S. Appl. No. 14/102,348 dated Dec. 15, 2017 (25 pages).
Non-Final Office Action for U.S. Appl. No. 14/102,348 dated Jan. 6, 2016 (15 pages).
Non-Final Office Action for U.S. Appl. No. 14/102,348 dated May 29, 2019 (17 pages).
Non-Final Office Action for U.S. Appl. No. 15/661,948 dated Jan. 24, 2019 (16 pages).
Non-Final Office Action for U.S. Appl. No. 15/661,993 dated Sep. 6, 2019 (11 pages).
Non-Final Office Action for U.S. Appl. No. 16/688,709 dated Dec. 24, 2020 (20 pages).
Notice of Allowance for U.S. Appl. No. 14/102,348 dated Aug. 20, 2020 (9 pages).
Notice of Allowance for U.S. Appl. No. 15/661,948 dated Jan. 9, 2020 (8 pages).
Novet, et al., "Amazon is getting ready to bring Alexa to work", CNBC, Nov. 29, 2017 (4 pages).
Palladino, Valentina, "Garmin teamed up with Amazon to make a tiny Echo Dot for your car", ars Technica, Oct. 17, 2017 (2 pages).
Perez, Sarah, "Alexa's 'Routines' will combine smart home control with other actions, like delivering your news and weather", TechCrunch, Sep. 28, 2017 (10 pages).
Perez, Sarah, "The first ad network for Alexa Skills shuts down following Amazon's policy changes", Tech Crunch, Jun. 15, 2017 (6 pages).
Porter, Jon, "Amazon Echo Show release date, price, news and features", Techradar, Jun. 26, 2017 (14 pages).
Pringle, Ramona, "'I'm sorry to hear that': Why training Siri to be a therapist won't be easy", CBC News, Sep. 24, 2017 (3 pages).
Purcher, Jack, "Apple Patent Reveals a New Security Feature Coming to Siri", Patently Apple, Apr. 4, 2017, reprinted from http://www.patentlyapple.com/patently-apple/2017/04/apple-patent-reveals-a-new-security-feature-coming-to-siri.html (6 pages).
Purcher, Jack, "The Patent behind Google Home's new Feature of Understanding Different Voices in the Home Surfaced Today", Patently Mobile, Apr. 20, 2017, reprinted from http://www.patentlymobile.com/2017/04/the-patent-behind-google-homes-new-feature-of-understanding-different-voices-in-the-home-surfaced-today.html (3 pages).
Purcher, Jack, "Today Google Home's Virtual Assistant can learn its Owner's voice for Security Reasons like Apple's Patent Pending Idea", Patently Apple, Apr. 20, 2017 (4 pages).
Roettgersaug, Janko, "The honest Chromecast review: Three weeks with Google's TV stick", Aug. 14, 2013 (8 pages).
Sablich, Justin, "Planning a Trip With the Help of Google Home", New York Times, May 31, 2017 (6 pages).
Seifert, Dan, "Samsung's new virtual assistant will make using your phone easier", The Verge, Mar. 20, 2017 (6 pages).
Sherr, Ian, "IBM built a voice assistant for cybersecurity", CNET, Feb. 13, 2017 (9 pages).
Siegal, Daniel, "IP Attys Load Up Apps' Legal Challenges At 'Silicon Beach'", Law360, Los Angeles, California, Feb. 2, 2017 (4 pages).
Smith, Dave, "The Amazon Echo got 2 incredibly useful features thanks to a new update", Business Insider, Jun. 1, 2017 (5 pages).

(56) References Cited

OTHER PUBLICATIONS

Willens, Max, "For publishers, Amazon Alexa holds promise but not much money (yet)", Digiday, Jul. 6, 2017 (6 pages).
Non-Final Office Action for U.S. Appl. No. 16/661,993 dated Mar. 30, 2021 (12 pages).

* cited by examiner

320

322 Initiate an application on a client device to enable the presentation of user-selected content delivered from a serving system to be presented on a separate but co-located presentation device

324 Provide user-identifying information to enable the serving system to locate profile information for the user

326 Receive an indication from a user of an intent by the user to receive a first content item on the separate but co-located presentation device

328 After the first content item is delivered to the separate co-located presentation device, receive an input from the user to interact with or adjust a presentation of the first content item

330 Provide, directly to the separate co-located presentation device, a prompt that includes the input

332 Receive one or more additional content items

FIG. 3B

PROVIDING CONTENT TO CO-LOCATED DEVICES WITH ENHANCED PRESENTATION CHARACTERISTICS

CROSS-REFERENCE TO RELATED APPLICATIONS

The present application is a continuation of U.S. patent application Ser. No. 14/102,348 filed on Dec. 10, 2013, which is hereby incorporated by reference in its entirety.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes identifying a user of an initiating device and locating profile information for the identified user, wherein the initiating device includes a display for presenting content to the user. The method further includes receiving an indication from an application running on the initiating device of an intent by the user to receive a first content item on a separate but co-located presentation device, the separate co-located presentation device having enhanced presentation characteristics, relative to the display of the initiating device, for presenting content. The method further includes selecting, by one or more processors, one or more additional content items for delivery along with the first content item including identifying a second different content item based at least in part on the profile information for the identified user and the enhanced presentation characteristics. The method further includes delivering, by one or more processors, the first and second different content items directly to the co-located presentation device without delivering the first and second different content items to the initiating device.

These and other implementations can each optionally include one or more of the following features. The initiating device can be a mobile communication device or tablet computer, and the presentation device can be a television. The first content item can be an Internet content item and the second different content item can be selected based at least in part on content or metadata of the Internet content item, wherein the Internet content item can be selected from the group comprising a multi-media content item, a graphical display item, an audio content item, an executable software application or an Internet resource. One or both of the first content item or the second different content item can be an audio content item. The enhanced presentation characteristics can include display characteristics or audio characteristics. The display characteristics can include higher resolution and larger screen area. Receiving an indication can include receiving a request to initiate a session for presenting content on the co-located presentation device, wherein the request includes an identifier for the first content item. Selecting one or more additional content items can include identifying eligible content items from an inventory of content items, and eligible content items can include items that are adapted for presentation in an environment that supports the enhanced presentation characteristics. Selecting one or more additional content items can include identifying a content item and adjusting one or more characteristics of the content item to produce the second different content item. Selecting one or more additional content items can include selecting a campaign associated with a content sponsor for providing the second different content item, the campaign having two or more associated content items each having different characteristics, and wherein selecting the second different content item can include selecting one of the two or more content items as the second different content item based at least in part on the enhanced presentation characteristics and associated characteristics of an individual content item of the two or more content items. The method can further include selecting a third different content item based at least in part on the second different content item and providing the third different content item to the initiating device for presentation on the initiating device after presentation of the second different content item on the co-located presentation device. The method can further include presenting information for presentation in a user interface (UI) to a sponsor of the second different content item to enable selection of different bids or different selection criteria or different content items for presentation based at least in part on the enhanced presentation characteristics or the characteristics associated with the display of the initiating device.

In general, another innovative aspect of the subject matter described in this specification can be implemented in methods that include another computer-implemented method for providing content. The method includes initiating an application on a client device to enable the presentation of user-selected content delivered from a serving system to be presented on a separate but co-located presentation device, wherein the client device includes a display for presenting content to the user. The method further includes providing, by one or more processors, user-identifying information to enable the serving system to locate profile information for the user. The method further includes receiving an indication from the application of an intent by the user to receive a first content item on the separate but co-located presentation device, the separate co-located presentation device having enhanced presentation characteristics, relative to the display of the client device, for presenting content. The method further includes, after the first content item is delivered to the separate co-located presentation device, receiving an input from the user to interact with or adjust a presentation of the first content item. The method further includes providing, directly to the separate co-located presentation device, a prompt that includes the input. The method further includes receiving one or more additional content items at the client device based on content that is delivered by the serving system directly to the separate co-located presentation device based at least in part on the content and the profile information.

In general, another innovative aspect of the subject matter described in this specification can be implemented in computer program products that include a computer program product tangibly embodied in a computer-readable storage device and comprising instructions. The instructions, when executed by one or more processors, cause the processor to: identify a user of an initiating device and locating profile information for the identified user, wherein the initiating device includes a display for presenting content to the user; receive an indication from an application running on the initiating device of an intent by the user to receive a first content item on a separate but co-located presentation device, the separate co-located presentation device having enhanced presentation characteristics, relative to the display of the initiating device, for presenting content; select, by one or more processors, one or more additional content items for delivery along with the first content item including identifying a second different content item based at least in part on the profile information for the identified user and the enhanced presentation characteristics; and deliver, by one or more processors, the first and second different content items directly to the co-located presentation device without delivering the first and second different content items to the initiating device.

These and other implementations can each optionally include one or more of the following features. The initiating device can be a mobile communication device or tablet computer and wherein the presentation device can be a television. The first content item can be an Internet content item and the second different content item can be selected based at least in part on content or metadata of the Internet content item, wherein the Internet content item is selected from the group comprising a multi-media content item, a graphical display item, an audio content item, an executable software application or an Internet resource. One or both of the first content item or the second different content item can be an audio content item. The enhanced presentation characteristics can include display characteristics or audio characteristics. The display characteristics can include higher resolution and larger screen area.

In general, another innovative aspect of the subject matter described in this specification can be implemented in systems, including a system comprising a user identification engine for identifying a user of an initiating device and for locating associated profile information for the identified user, a user intent engine for receiving an indication from an application running on the initiating device of an intent by the user to receive a first content item on a separate but co-located presentation device, a content identification engine for selecting one or more additional content items for delivery along with the first content item, including identifying a second different content item based at least in part on the profile information for the identified user and the enhanced presentation characteristics, and a content delivery engine for delivering the first and second different content items directly to the co-located presentation device without delivering the first and second different content items to the initiating device.

Particular implementations may realize none, one or more of the following advantages. Content sponsors can elect to bid higher for presentations of their content to devices that have enhanced presentation characteristics. Users can enjoy a better user experience that results from the presentation of content on devices having enhanced display and/or audio characteristics.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIG. 3B is a flowchart of an example process for presenting simulcast content on an initiating device and an associated presentation device.

Like reference numbers and designations in the various drawings indicate like elements.

DETAILED DESCRIPTION

This document describes systems, methods, computer program products and mechanisms for delivering content to a presentation device that is separate from, but co-located with, an initiating device. For example, a user associated with an initiating device (e.g., a laptop computer, tablet computer, smartphone or other mobile or non-mobile communication device) can be identified, and profile information associated with the user can be located. The initiating device, for example, can include a display for presenting content to the user. An indication can be received from an application running on the initiating device of an intent by the user to receive a first content item on a separate but co-located presentation device (e.g., a video to be presented on the television). For example, the separate but co-located presentation device (e.g., in the same room) can have enhanced presentation characteristics, relative to the display of the initiating device, for presenting content, such as enhanced display characteristics or audio characteristics. One or more additional content items can be selected for delivery along with the first content item, including identifying a second different content item based, at least in part, on the profile information for the identified user and the enhanced presentation characteristics. The first and second different content items can be delivered directly to the co-located presentation device without delivering the first and second different content items to the initiating device. For example, the video and content item can be presented on the television and not on the user's initiating device.

While the examples provided herein include the use of two devices that are co-located, other configurations are possible. In some implementations, configurations can exist in which more than two devices are used, e.g., including plural of either or both of initiating devices and presentation devices. In some implementations, the initiating device and the presentation device need not be co-located, e.g., if the initiating device controls content provided to one or more remote presentation devices. Other configurations are possible.

Figure 1:
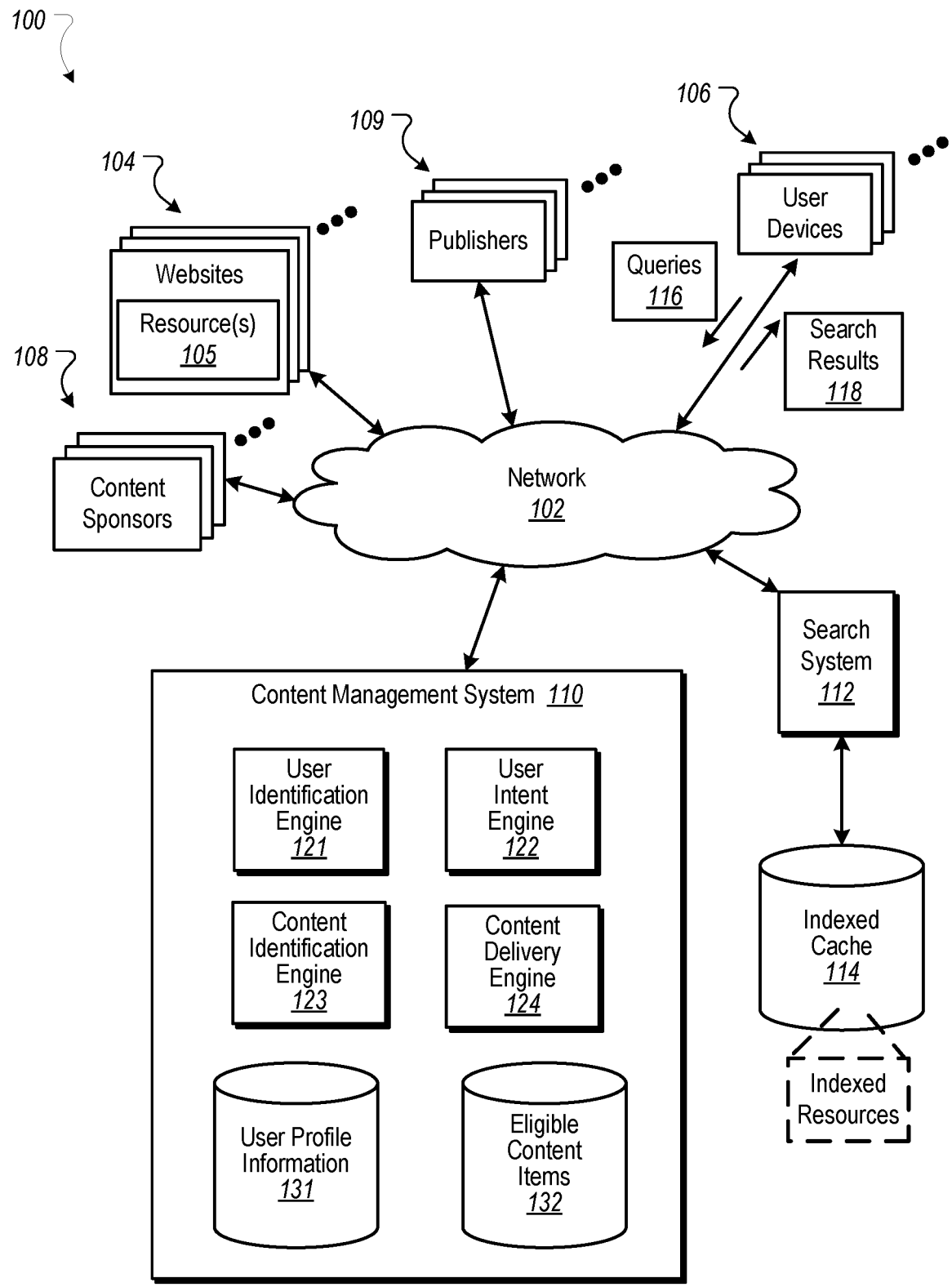
FIG. 1 is a block diagram of an example environment for delivering content.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. A data store of user profile information 131, for example, can include profile information about users (e.g., including user interests). User interest information associated with user profile information can include information declared by a user in creating the user profile. User interest information can also include information directly derived or inferred from user actions on the network 102, such as Web page navigation, resource consumption, endorsements, communications, search queries and the like. For situations in which the systems discussed here collect information about users, or may make use of information about users, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that certain information about the user is removed. For example, a user's identity may be treated so that no identifying information can be determined for the user, or a user's geographic location may be generalized where location information is obtained (such as to a city, ZIP code, or state level), so that a particular location of a user cannot be determined. Thus, the user may have control over how information is collected about the user and used by a content server. In some implementations, the user profile information 131 can be organized by user identifier or in other ways. A data store of eligible content items 132 can include different types of content items such as multi-media content items, graphical display content items, audio content item, executable software applications, Internet resources, and other formats or types of content items.

The content management system 110 can include plural engines, some or all of which may be combined or separate, and may be co-located or distributed (e.g., connected over the network 102). A user identification engine 121, for example, can identify a user of an initiating device and locate associated profile information for the identified user. For example, the initiating device can be the user's laptop computer, tablet computer, smartphone or other mobile or non-mobile communication device.

A user intent engine 122 can receive an indication from an application running on the initiating device of an intent by the user to receive a first content item on a separate but co-located presentation device (e.g., a television). For example, the separate but co-located presentation device can have enhanced presentation characteristics, relative to the display of the initiating device, for presenting content.

A content identification engine 123, for example, can select one or more additional content items for delivery along with the first content item, including identifying a second different content item based at least in part on the profile information for the identified user and the enhanced presentation characteristics. For example, the content identification engine 123 can identify a content item related to fast cars to be presented on the television with a video related to cars, e.g., using profile information indicating that the user is interested in fast cars.

A content delivery engine 124, for example, can deliver the first and second different content items directly to the co-located presentation device without delivering the first and second different content items to the initiating device. For example, the car-related video and fast car-related content item can be provided to the television and not to the user's initiating device.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. In some implementations, the search results 118 include the content itself, such as a map, or an answer, such as in response to a query for a store's products, phone number, address or hours of operation. In some implementations, the content management system 110 can generate search results 118 using information (e.g., identified resources) received from the search system 112. An example search result 118 can include a webpage title, a snippet of text or a portion of an image extracted from the webpage, and the Universal Resource Locator (URL) of the webpage. Search results pages can also include one or more slots in which other content items can be presented. In some implementations, slots on search results pages or other webpages can include content slots for content items that have been provided as part of a reservation process. In a reservation process, a publisher and a content item sponsor enter into an agreement where the publisher agrees to publish a given content item (or campaign) in accordance with a schedule (e.g., provide 1000 impressions by date X) or other publication criteria. In some implementations, content items that are selected to fill the requests for content slots can be selected based, at least in part, on priorities associated with a reservation process (e.g., based on urgency to fulfill a reservation).

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
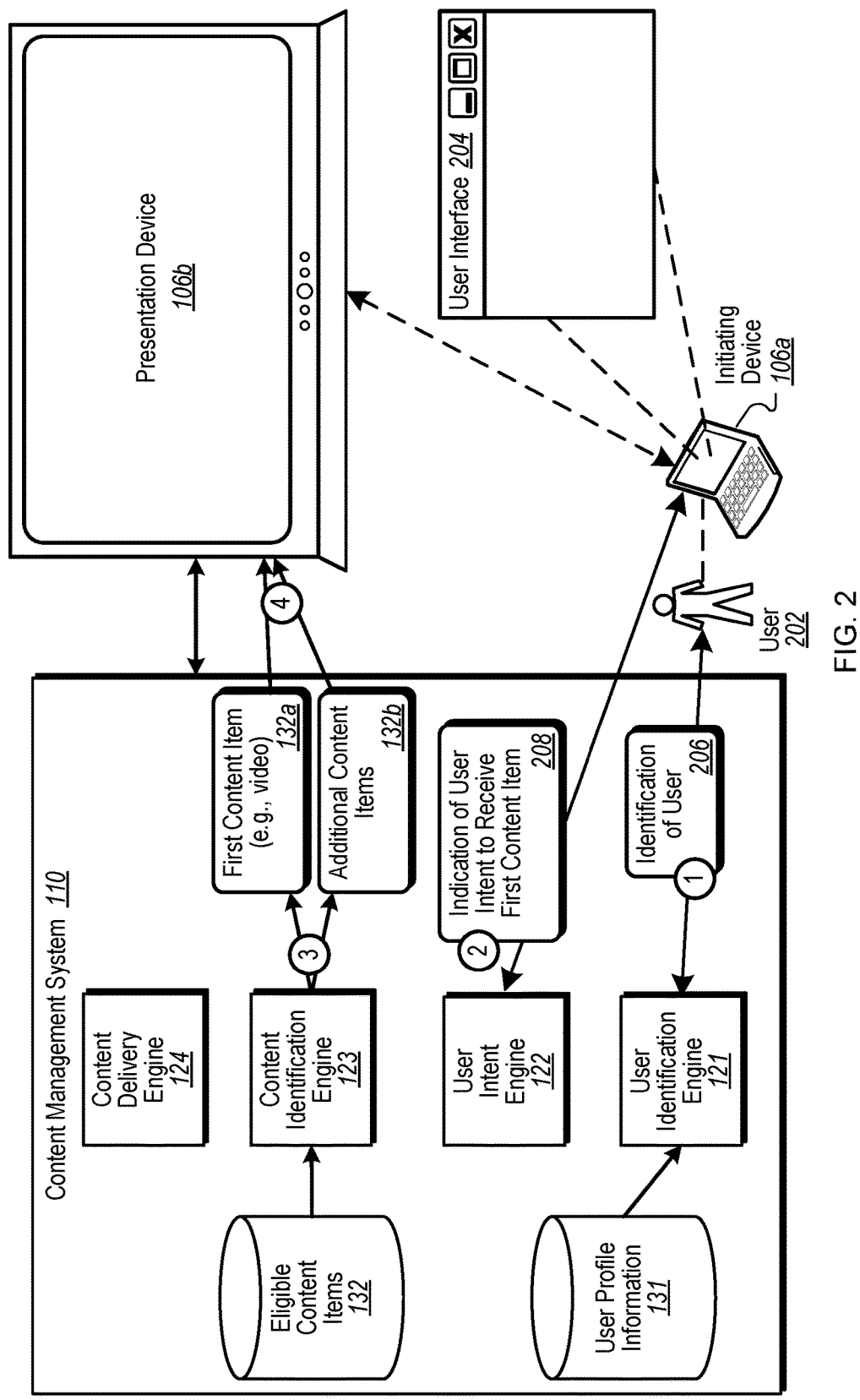
FIG. 2 shows an example system for providing content.

FIG. 2 shows an example system 200 for providing content. For example, in the system 200, content is requested by an initiating device 106a for receipt by, and presentation on, a separate but co-located presentation device 106b (e.g., a television, such as the user's Internet-connected television). The initiating device 106a can be, for example, a laptop computer, a tablet computer, a smartphone, or some other mobile or non-mobile communication device of a user 202. In some implementations, the initiating device 106a can be in proximity of (e.g., in the same room as) the presentation device 106b. The initiating device 106a can be in communication with the presentation device 106b, such as is shown in conjunction with FIG. 2. The initiating device 106a can include a display for presenting content to the user, e.g., including a user interface that serves as a remote control for the presentation device 106b and other purposes. In some implementations, a user interface 204, e.g., running on the initiating device 106a, can allow the user 202 to control presentation, including selection and presentation of content, on the presentation device 106b. In some implementations, providing content within the system 200 can occur in the following example sequence of stages.

At stage 1, for example, the user identification engine 121 can identify (206) the user 202 of (e.g., associated with) the initiating device 106a and locate profile information for the identified user 202. The user 202, in this example, can be a user using the initiating device 106a to control content selected for presentation on the presentation device 106b. In some implementations, identification of the user 202 can include using login credentials provided by the user when logging into a user service associated with the user's use of the initiating device 106a. The identification of the user 202 can be based on information that is available in the user profile information 131. Other ways of identifying the user are possible.

At stage 2, for example, the user intent engine 122 can receive an indication 208 from an application running on the initiating device 106a of an intent, by the user 202, to receive a first content item 132a on the separate but co-located presentation device 106b. In the current example, the presentation device 106b can have enhanced presentation characteristics, relative to the display of the initiating device, for presenting content. In some implementations, the enhanced presentation characteristics can include, for example, display characteristics (e.g., higher resolution and/or a larger screen area) or audio characteristics (e.g., higher-quality speakers or other sound components). Other enhanced presentation characteristics are possible. The first content item 132a, for example, can be a video (e.g., that includes rich content) that can be streamed to the presentation device 106b or that uses other enhanced presentation capabilities of the device. Also, the first content item 132a, for example, can be one of the eligible content items 132, e.g., a particular video selected by the user 202 using the user interface 204 for presentation on the presentation device 106b.

At stage 3, for example, the content identification engine 123 can select one or more additional content items 132b for delivery along with the first content item 132a. The selection of the one or more additional content items can include, for example, identifying at least second different content items, such as from the eligible content items 132. The identification can be based, at least in part, on the profile information for the identified user (e.g., user 202) and the enhanced presentation characteristics of the presentation device 106b. For example, the content identification engine 123 can identify content items that are selected based, at least in part, on user profile information for the user 202. The selection of content items, for example, can also be based on information associated with the first content item. The content item can be an ad. For example, the first content item 132a can be a video that includes scenes of cars, and the user's profile information can indicate an interest in fast cars. As such, the one or more additional content items 132b selected by the content identification engine 123 can include content items for sports cars or other cars of potential interest to the user 202. In some implementations, the additional content items 132b selected in the current example and other examples can be enhanced versions of eligible content items 132 that are available for presentation on devices not having enhanced presentation characteristics.

At stage 4, for example, the content delivery engine 124 can deliver the first and second different content items directly to the co-located presentation device 106b, without delivering the first and second different content items to the initiating device 106a. For example, after the request for content, e.g., in the form of the indication 208, is received from the initiating device 106a, the content management system 110 can provide the content (e.g., the first content item 132a and additional content items 132b) to the presentation device 106b. Alternatively, or in addition, the content management system 110 can provide additional content items 132b to the initiating device 106a while or after processing the request for the first content item 132a.

Figure 3A:
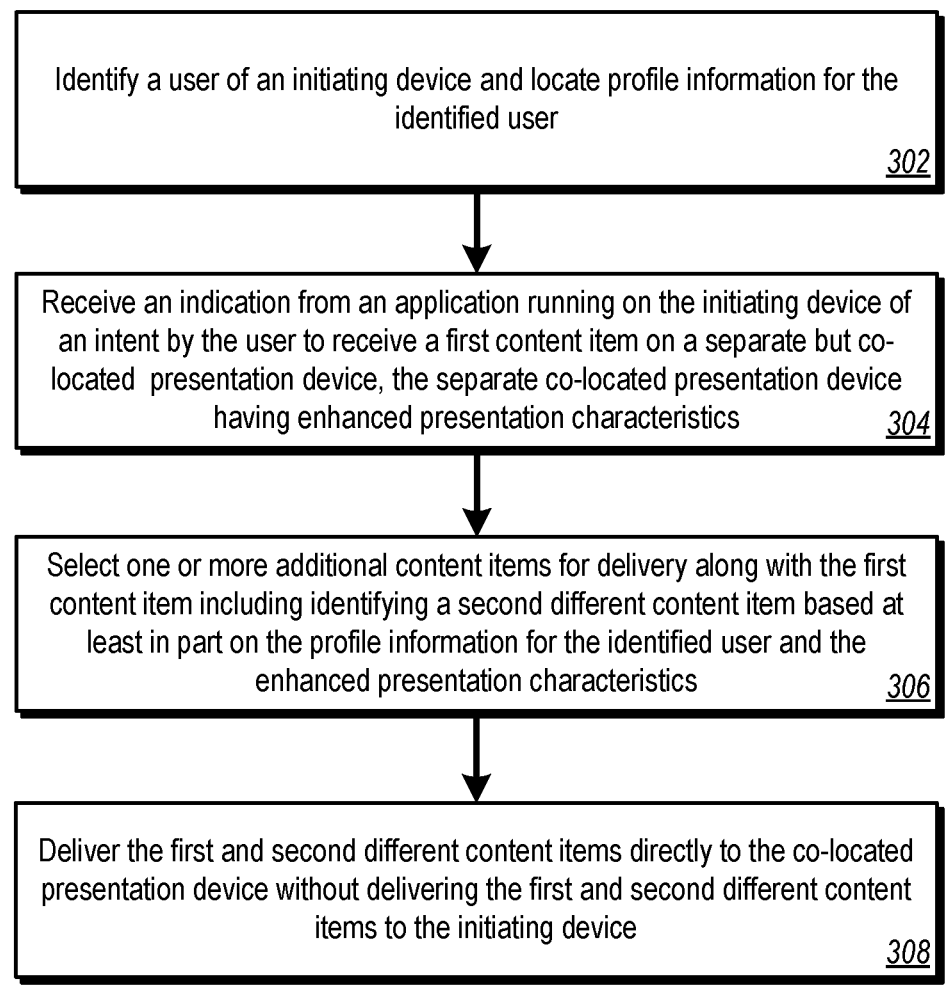
FIG. 3A is a flowchart of an example process for providing content to a device having enhanced presentation characteristics.

FIG. 3A is a flowchart of an example process 300 for providing content to a device having enhanced presentation characteristics. In some implementations, the content management system 110 can perform stages of the process 300 using instructions that are executed by one or more processors. FIGS. 1-2 are used to provide example structures for performing the steps of the process 300.

A user of an initiating device is identified, and profile information for the identified user is located (302). The initiating device includes a display for presenting content to the user. For example, the user identification engine 121 can identify the user 202 as the user using the initiating device 106a, e.g., the user's laptop computer, tablet computer, smartphone, or other mobile or non-mobile computation device. The user identification engine 121 can also locate user profile information 131 for the user 202, e.g., using a user identifier, account information, a device identifier, or other information.

An indication is received from an application running on the initiating device of an intent by the user to receive a first content item on a separate but co-located presentation device (304). The separate co-located presentation device has enhanced presentation characteristics, relative to the display of the initiating device, for presenting content. As an example, based on user selections on the user interface 204, the initiating device 106a can send the indication 208 to the content management system 110, e.g., where it is received by the user intent engine 122. The indication 208, for example, can include information regarding a particular content item (e.g., a video) selected by the user 202 for presentation on the presentation device 106b.

In some implementations, receiving an indication can include receiving a request to initiate a session for presenting content on the co-located presentation device, wherein the request includes an identifier for the first content item. For example, the user 202 can input the name, title, URL or other information associated with the video that is to be presented on the television.

In some implementations, the initiating device 106a and the presentation device 106b can be communicatively coupled, e.g., using near field communication (NFC), direct Wifi, a local area network or other communication link.

One or more additional content items are selected for delivery along with the first content item (306). The selection can include identifying a second different content item based at least in part on the profile information for the identified user and the enhanced presentation characteristics. For example, the content identification engine 123 can select one or more content items (e.g., related to cars) to be presented on the presentation device 106b with the user-selected video (e.g., about fast cars). Selection of the one or more content items, for example, can be based on user profile information for the user. Also, the types of enhanced versions of the content items, for example, that are selected can be based on the enhanced presentation characteristics of the presentation device 106b. In some implementations, the indication 208, when received by the user intent engine 122, can include information associated with the enhanced presentation characteristics (e.g., capabilities) of the presentation device 106b.

In some implementations, the first content item can be an Internet content item, and the second different content item can be selected based, at least in part, on content or metadata of the Internet content item. For example, the first content item to be presented on the television can be a car-related video from a video content sharing site (or other location), and the second content item (e.g., a content item related to cars) can be selected based on the first content item and/or metadata associated with the car-related video. In some implementations, the Internet content item can be a multimedia content item, a graphical display item, an audio content item, an executable software application, an Internet resource, or some other content item.

In some implementations, one or both of the first content item or the second different content item can be or include an audio feed (e.g., radio). Other combinations of formats are possible.

In some implementations, selecting one or more additional content items can include identifying eligible content items from an inventory of content items (e.g., the eligible content items 132). In some implementations, eligible content items can include items that are adapted for presentation in an environment that supports the enhanced presentation characteristics, e.g., an ad or other content items that have been designed to appear on televisions or other devices having enhanced visual and/or audio presentation characteristics (e.g., capabilities).

In the example shown, first and second different content items are delivered directly to the co-located presentation device without delivering the first and second different content items to the initiating device (308). For example, the content management system 110 can provide the first content item 132a (e.g., car-related video) and the one or more additional content items 132b (e.g., presentation-enhanced car-related content items) to the presentation device 106b. Alternatively, or in addition, the content management system 110 can provide additional content items to the initiating device 106a while or after processing a request to send a first content item 132a to the presentation device 106b.

In some implementations, selecting the one or more additional content items can include identifying a content item (e.g., from the eligible content items 132) and adjusting one or more characteristics of the content item to produce the second different content item. For example, the content management system 110 can make changes to a script or other code or logic associated with the car-related video to include commands or other features that change the content item to be adapted to an enhanced environment. In some implementations, the adjustments can be table-driven, e.g., to automatically substitute one aspect of the content item with another. In some implementations, the adjustments can be based on the type of device on which the content item will be presented, e.g., as some televisions may have higher resolutions or screen sizes than others.

In some implementations, selecting the one or more additional content items can include selecting a campaign associated with a content sponsor for providing the second different content item, the campaign having two or more associated content items each having different characteristics (e.g., a high-resolution and a low-resolution version of the same content item). In some implementations, selecting the second different content item can include selecting one of the two or more content items as the second different content item based at least in part on the enhanced presentation characteristics and associated characteristics of an individual content item of the two or more content items. For example, the content item selected (e.g., high-resolution versus low-resolution) can depend on the request and on the particular type of device on which the content item will be presented.

In some implementations, the process 300 can further include selecting a third different content item based at least in part on the second different content item and providing the third different content item to the initiating device for presentation on the initiating device after presentation of the second different content item on the co-located presentation device. For example, the content management system 110 can select an additional one of the eligible content items 132 (e.g., another car-related content item) for delivery to the initiating device 106a. In this example, the content item that is presented to the user 202 on the user's laptop, table computer, smartphone or other computing device can be a low-resolution car-related content item that may or may not be related to the high-resolution content item appearing on the user's television.

In some implementations, the process 300 can further include presenting information for presentation in a user interface (UI) to a sponsor of the second different content item to enable selection of different bids or different selection criteria of different content items for presentation based at least in part on the enhanced presentation characteristics of a presentation device (i.e., the device used to present the second content item) or the characteristics associated with the display of the initiating device. For example, campaign sponsors can use options and controls for setting different bids for impressions of creatives depending on the circumstances, e.g., using higher bids for content items that are to be presented on televisions having enhanced presentation characteristics when their enhanced presentation content is presented on such devices.

FIG. 3B is a flowchart of an example process 320 for presenting simulcast content on an initiating device and an associated presentation device. In some implementations, the content management system 110 can perform stages of the process 320 using instructions that are executed by one or more processors. FIGS. 1-2 are used to provide example structures for performing the steps of the process 320.

An application is initiated on a client device to enable the presentation of user-selected content delivered from a serving system to be presented on a separate but co-located presentation device (322). The client device can include, for example, a display for presenting content to the user. For example, the user interface 204 can be started by the user 202 on the initiating device 106a (e.g., the user's laptop computer, tablet computer, smart phone, or other mobile or non-mobile communication device). In this example, the initiating device 106a can be configured (e.g., by being Internet-enabled) to interface with the content management system 110 to control content presented on the presentation device 106b (e.g., the user's Internet-enabled, large-screen television).

User-identifying information is (e.g., optionally) provided to enable the serving system to locate profile information for the user (324). For example, information provided by the user on, or available from, the initiating device 106a can be used by the user identification engine 121 to look up user profile information 131 (e.g., identifying user interests) associated with the user 202.

An indication is received from the application of an intent by the user to receive a first content item on the separate but co-located presentation device (326). The separate co-located presentation device has enhanced presentation characteristics, relative to the display of the client device, for presenting content. For example, user selections made by the user 202 in the user interface 204 can cause the initiating device 106a to send the indication 208 to the content management system 110, e.g., where it is received by the user intent engine 122. The indication 208, for example, can include information regarding a particular content item (e.g., a video) selected by the user 202 for presentation on the presentation device 106b.

After, or during delivery of the first content item to the separate co-located presentation device, an input is received from the user to interact with or adjust a presentation of the first content item (328). As an example, after the video begins playing on the presentation device 106b, the user 202 can make a section on the initiating device 106a to control the presentation (e.g., volume, play, etc.) of the video on the presentation device 106b. For example, the selection can be associated with a simulcast of related content to be presented on the initiating device 106a and the presentation device 106b.

A prompt is provided directly to the separate co-located presentation device that includes the input (330). For example, in communication between the initiating device 106a and the presentation device 106b, the user's input on the initiating device 106a can cause a prompt to appear that is associated with the simulcast presentation of content on the initiating device 106a and that is related to content presented on the presentation device 106b.

One or more additional content items are received at the initiating device based on content that is delivered by the serving system directly to the separate co-located presentation device based at least in part on the content and the profile information (332). For example, content, such as content items related to fast cars, can be received at the initiating device 106a that are selected based on the video being presented on the presentation device 106b and further based on user profile information associated with the user 202. Selection of an content item related to fast cars can be made, for example, because the video is related to the theme of cars, and more specifically, the video is related to a known interest by the user 202 in fast cars.

Figure 4:
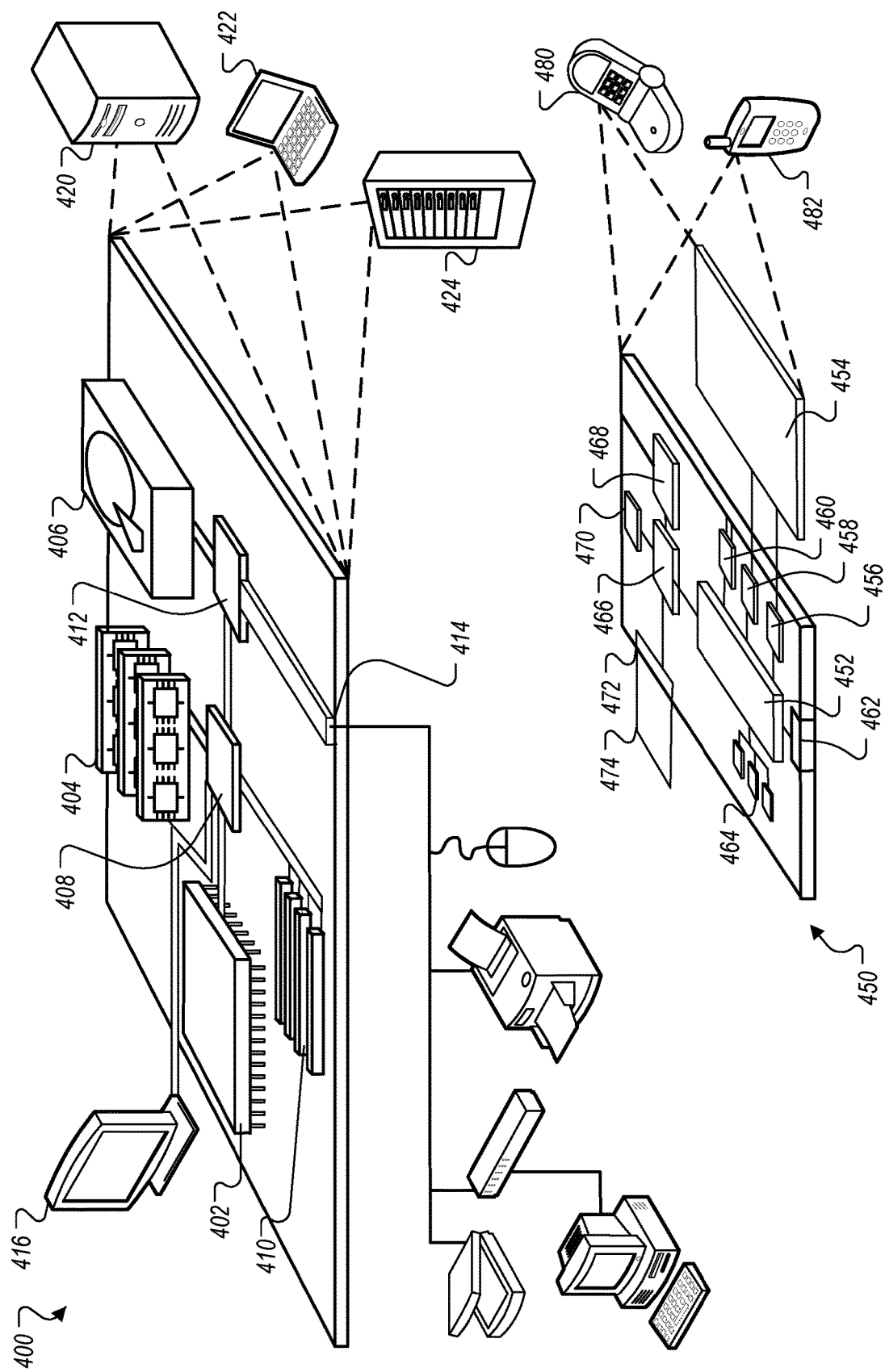
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processors embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method for initiating presentation of media items on display devices via client devices, the method comprising:
   receiving, by one or more servers from a client device, a request for streaming a multi-media item to an Internet connected display device, both the Internet connected display device and the client device connected to a local area network, and the request including an identifier of the multi-media item;
   identifying, by the one or more servers, the multi-media item using the identifier of the multi-media item;
   establishing, by the one or more servers, responsive to receiving the request from the client device, a communication session between the one or more servers and the Internet connected display device to stream the multi-media item;
   streaming, by the one or more servers via the communication session, the multi-media item to the Internet connected display device for display, the client device configured to present a user interface for directly providing a command to the Internet connected display device to adjust a presentation of the multi-media item;
   initiating, by the one or more servers, transmission of a second content item to the Internet connected display device; and
   initiating, by the one or more servers, transmission of an additional content item to the client device, wherein the additional content item is selected based on the multi-media item streamed to the Internet connected display device;
   wherein the additional content item is selected from a content sponsor that provides the second content item, the second content item and the additional content item selected from a campaign having two or more associated content items each having different characteristics.

2. The method of claim 1, wherein the additional content item is further selected based on a profile associated with the client device.

3. The method of claim 1, wherein the additional content item is transmitted to the client device while processing the request for streaming the multi-media item.

4. The method of claim 1, wherein the additional content item is transmitted to the client device and the Internet connected display device.

5. The method of claim 1, wherein the additional content item is transmitted to the client device after Presentation of the second content item on the Internet connected display device.

6. The method of claim 1, wherein the Internet connected display device is an Internet-enabled television.

7. The method of claim 1, wherein the command is configured to control the presentation of the multi-media item after the multi-media item begins playing on the Internet connected display device.

8. A computing system comprising:
   one or more processors; and
   one or more non-transitory computer-readable media storing instructions that are executable by the one or more processors to cause the computing system to perform operations, the operations comprising:
   receiving, from a client device, a request for streaming a multi-media item to an Internet connected display device, the request including an identifier of the multi-media item, wherein the Internet connected display device is configured to send and receive data over the Internet;
   identifying the multi-media item using the identifier of the multi-media item;
   establishing, responsive to receiving the request from the client device, a communication session with the Internet connected display device to stream, via the Internet, the multi-media item; and
   streaming, via the communication session, the multi-media item to the Internet connected display device for display, the client device configured to present a user interface for directly providing a command to the Internet connected display device to adjust a presentation of the multi-media item;
   initiating transmission of a second content item to the Internet connected display device; and
   initiating transmission of an additional content item to the client device, wherein the additional content item is selected based on the multi-media item streamed to the Internet connected display device;
   wherein the additional content item is selected from a content sponsor that provides the second content item, the second content item and the additional content item selected from a campaign having two or more associated content items each having different characteristics.

9. The computing system of claim 8, wherein the additional content item is further selected based on a profile associated with the client device.

10. The computing system of claim 8, wherein the additional content item is transmitted to the client device while processing the request for streaming the multi-media item.

11. The computing system of claim 8, wherein the additional content item is transmitted to the client device and the Internet connected display device.

12. The computing system of claim 8, wherein the additional content item is transmitted to the client device after presentation of the second content item on the Internet connected display device.

13. The computing system of claim 8, wherein the Internet connected display device is an Internet-enabled television.

14. The computing system of claim 8, wherein the command is configured to control the presentation of the multi-media item after the multi-media item begins playing on the Internet connected display device.

15. One or more non-transitory computer-readable media storing instructions that are executable by one or more processors to cause a computing system to perform operations, the operations comprising:
- receiving, from a client device, a request for streaming a multi-media item to an Internet connected display device, the request including an identifier of the multi-media item, wherein the Internet connected display device is configured to send and receive data over the Internet;
- identifying the multi-media item using the identifier of the multi-media item;
- establishing, responsive to receiving the request from the client device, a communication session with the Internet connected display device to stream, via the Internet, the multi-media item; and
- streaming, via the communication session, the multi-media item to the Internet connected display device for display, the client device configured to present a user interface for directly providing a command to the Internet connected display device to adjust a presentation of the multi-media item;
- initiating transmission of a second content item to the Internet connected display device; and
- initiating transmission of an additional content item to the client device, wherein the additional content item is selected based on the multi-media item streamed to the Internet connected display device;
- wherein the additional content item is selected from a content sponsor that provides the second content item, the second content item and the additional content item selected from a campaign having two or more associated content items each having different characteristics.

16. The one or more non-transitory computer-readable media of claim 15, wherein the additional content item is further selected based on a profile associated with the client device.

17. The one or more non-transitory computer-readable media of claim 15, wherein the additional content item is transmitted to the client device while processing the request for streaming the multi-media item.

18. The one or more non-transitory computer-readable media of claim 15, wherein the additional content item is transmitted to the client device and the Internet connected display device.

19. The one or more non-transitory computer-readable media of claim 15, wherein the additional content item is transmitted to the client device after presentation of the second content item on the Internet connected display device.

20. The one or more non-transitory computer-readable media of claim 15, wherein the command is configured to control the presentation of the multi-media item after the multi-media item begins playing on the Internet connected display device.

* * * * *